United States Patent [19]

Zahalka et al.

[11] Patent Number: 4,624,002
[45] Date of Patent: Nov. 18, 1986

[54] CIRCUIT ARRANGEMENT FOR DECREASING THE CORROSION OF THE ELECTRODES IN A FURNACE FOR THE ELECTRIC MELTING OF VITREOUS MATERIAL

[75] Inventors: Pavel Zahalka; Jaroslav Stanek; Jirî Matej, all of Prague, Czechoslovakia

[73] Assignee: Vysoka skola chemicko-technologicka, Prague, Czechoslovakia

[21] Appl. No.: 756,361

[22] Filed: Jul. 18, 1985

Related U.S. Application Data

[63] Continuation-in-part of Ser. No. 597,443, Apr. 6, 1984, abandoned.

[30] Foreign Application Priority Data

Apr. 6, 1983 [CS] Czechoslovakia ............... 2406-83

[51] Int. Cl.⁴ .................................................. C03B 5/027
[52] U.S. Cl. .................................................. 373/40
[58] Field of Search ............ 373/27, 39, 40, 29, 373/109, 120, 135, 136; 363/9, 10, 160

[56] References Cited

U.S. PATENT DOCUMENTS

| | | | |
|---|---|---|---|
| 3,431,483 | 3/1969 | Lafuze | 363/10 |
| 3,593,104 | 7/1971 | Fisher et al. | 363/160 |
| 4,303,972 | 12/1981 | Stacey et al. | 363/10 |
| 4,412,334 | 10/1983 | Tironi et al. | 373/40 |

*Primary Examiner*—Roy N. Envall, Jr.

[57] ABSTRACT

A circuit for performing a method melting vitreous materials in an electric furnace wherein the electrodes are supplied with an alternating current of optimal frequency lower than 60 or 50 Hz, respectively, the corrosion of electrodes being minimized. The circuit comprises a cycloconverter which changes a three-phase current supply into a single-phase current with a simultaneous changing of the input mains frequency into an optimal output frequency. The circuit also comprises a device for measuring and/or controlling the direct current component of the low frequency feeding alternating current, in order to stabilize the favorable anticorrosion effect of the low optimal frequency. Further, it comprises a device for the control of the power input of the cycloconverter with respect to the melting temperature in the furnace.

3 Claims, 5 Drawing Figures

CIRCUIT ARRANGEMENT FOR DECREASING THE CORROSION OF THE ELECTRODES IN A FURNACE FOR THE ELECTRIC MELTING OF VITREOUS MATERIAL

This application is a continuation-in-part of application Ser. No. 597,443, filed Apr. 6, 1984 now abandoned.

BACKGROUND OF THE INVENTION

This invention relates to a circuit arrangement for the direct electric heating of melts having tonic conductivity, particularly vitreous materials or glass melts.

Electric melting of some e.g. lead oxide glasses is limited by heavy corrosion of molybdenum electrodes which leads to the contamination of the glass melt. On the other hand, the electric melting of this type of glass might be very desirable since it reduces the volatilization of substances harmful to human health (Pb O).

The amount of substances being capable of oxidizing molybdenum as e.g. lead oxide, refining and coloring agents—the so-called depolarizers—defines the corrodibility of the glass melt. Molybdenum is oxidized on account of the reduction of the depolarizer. The rate of corrosion is determined by the intensity of anodic partial current.

Another important corrosion factor is the loading of the electrode by alternating electric current. It has been proven that the corrosion in a glass melt is influenced not only by the power loading but also by the surface current density. The amount of corroded molybdenum and precipitated lead are approximately equivalent within broad limits of the alternating current loading.

In accordance with theory concerning the corrosion of metals by alternating current, the reason for accelerated corrosion is the increase of the mean value of the anodic partial, i.e. corrosive, current. The mean value of the cathodic partial current, being a measure of the rate of depolarization reactions, tends to be equally on the increase. In accordance with the above-mentioned theory, the corrosive effect increases with growing alternating current density, but decreases with increasing frequency. The reason for the decreasing effect with higher frequencies is the growing part of the reactive-capacity-current which does not participate in the electrode reactions.

The theoretical assumptions as to the conditions of electric melting of glass need not have been always fulfilled. Due to heavy current loadings of electrodes, some other different mechanism retarding corrosion may take part in the process. This finding is confirmed by the change of the shape of the polarizing curve.

These experimental, as well as practical, results described in current literature, have proved that electrode corrosion increases with increased alternating current density and decreases with increasing frequency. The frequencies used are considered to be 50 or more Hz.

The study of the dependence of molybdenum electrode corrosion in a glass melt upon frequency has shown that in a definite region of low frequencies—namely under 50 Hz—the corrosion as well as the amount of decomposed depolarizer may decrease with decreasing frequency. The curve (not shown here) which illustrates the dependence of the corrosion rate on frequency presents a minimum of corrosion at some optimal frequency.

The rate of corrosion at this optimal frequency may be suppressed under the the corrosion at the currentless stage. Below this optimal frequency the rate of corrosion tends to be on the increase again.

The dependence on frequency of the amount of decomposed depolarizers and of the corrosion of molybdenum in different glass melts has a complicated course with a maximum and minimum. The location of these two extremes depends on the current density and the temperature of the electrode surface.

The results may be generalized so that the rate of the corrosion process is in a broad range of conditions a function of the ratio between current density and frequency of the alternating current. This ratio is proportional to the quantity of the electric charge transferred in a half period.

The fact that there exists an optimal low frequency region in which the rate of corrosion decreases may be employed for the protection of electrodes against corrosion. It is an advantage of this method that there is no need for any auxiliary electrodes when an anodic or cathodic protection is being applied. Likewise it is unnecessary to make changes in the construction of the melting furnace.

Static power frequency changers (cycloconverters) generating an electrical output wave form having a frequency which differs from the input frequency are known. Such cycloconverters, usually provided with thyristors, are generally used for the control of the speed of asynchronous motors.

Their application for powering vitreous materials furnaces or glass melting furnaces is not known. The circuit arrangements of known cycloconverters are not suitable for this purpose.

It is an object of this invention to provide a circuit arrangements capable to supply vitreous materials melting furnaces by an alternating electric current with a frequency lower then 60 or 50 Hz. The circuit arrangements of the invention contain devices enabling the changing of a 3-phase input into a single phase output power and simultaneously the changing of the mains frequency into an optimal one with respect to the minimal corrosion of electrodes to adjust and control the optimal low frequency of the electric current feeding of furance, whereby to measure and/or control the optimal value of the direct current component of the feeding current, and to measure and/or control the power input of the furnace to a constant level or to maintain constant melting temperature.

In accordance with the invention, the preferred arrangements for for feeding powering a glass melting furnace employs a cycloconverter which consists of two 3-phase banks of thyristors interconnected on the DC side by reactors to make the shape of the output current wave smoother, although the wave shape does not play any important role in this case.

The input of the cycloconverter is connected to a threephase transformer having a mains frequency (50 or 60 Hz). The frequency of the single phase output is adjusted to a value of frequency at which the rate of corrosion of the electrodes in the furnace is suppressed to its minimum.

The ability to change the three-phase input into a single-phase output with a simultaneous change of frequency of the output alternating current is a feature of the cycloconverter which may be favorably exploited for powering (feeding) an electric glass melting furnace. The three-phase input of the cycloconverter guarantees the uniform loading of the three-phase mains, and the single-phase output, on the other hand, renders better distributed electric and power fields between the electrodes. The uniformly distributed fields favorably influence the flow of glass melt in the furnace. The change of the three-phase into a single-phase AC has been until now realized by a Scott transformer without, of course, having the possibility of changing the frequency.

The shape of the single-phase alternating current wave at the output of the cycloconverter plays a secondary role only. The corrosion of electrodes is also on the decrease when a nonharmonic AC of optimal frequency is being applied. On the other hand, it is important to keep the quantity of the electric charge transferred in each half-period (half wave) as equal as possible. The shapes of the positive and negative half-waves are not important, but their areas, i.e. the amounts of power delivered by each have to be as equal as possible. The value of the DC component is determined by the difference between the areas of the positive and negative half-waves in a period.

When the areas charges (amounts of power) of the positive and negative half-waves of a period (a cycle) of the low frequency AC are not identical, then the position of their "line of symmetry" differs from the "zero line".

It is, therefore, another object of the invention to measure and/or control the DC component of the power delivered to the furnace in order to stabilize the favorable anticorrosion effect of the optimal frequency.

The circulating currents, which may arise between positive and negative banks of the thyristors, due to a reactor connecting the positive and negative banks, are eliminated by introducing a time dwell between the positive and negative half-waves of the current. By prolonging the time of commutation, there is simultaneously created a proof against the short-circuiting of positive and negative banks of thyristors. The above mentioned means may have a partially negative influence on the shape of the output wave form. As mentioned before, the wave-form, however, is not critical with regard to the corrosion of the electrodes.

BRIEF DESCRIPTION OF THE DRAWINGS

With these and other objects in view, which will become apparent in the following detailed description, the present invention, which is shown by example only, will be more clearly understood in connection with the accompanying drawings, in which.

DESCRIPTION OF PREFERRED EMBODIMENTS

Figure 1:
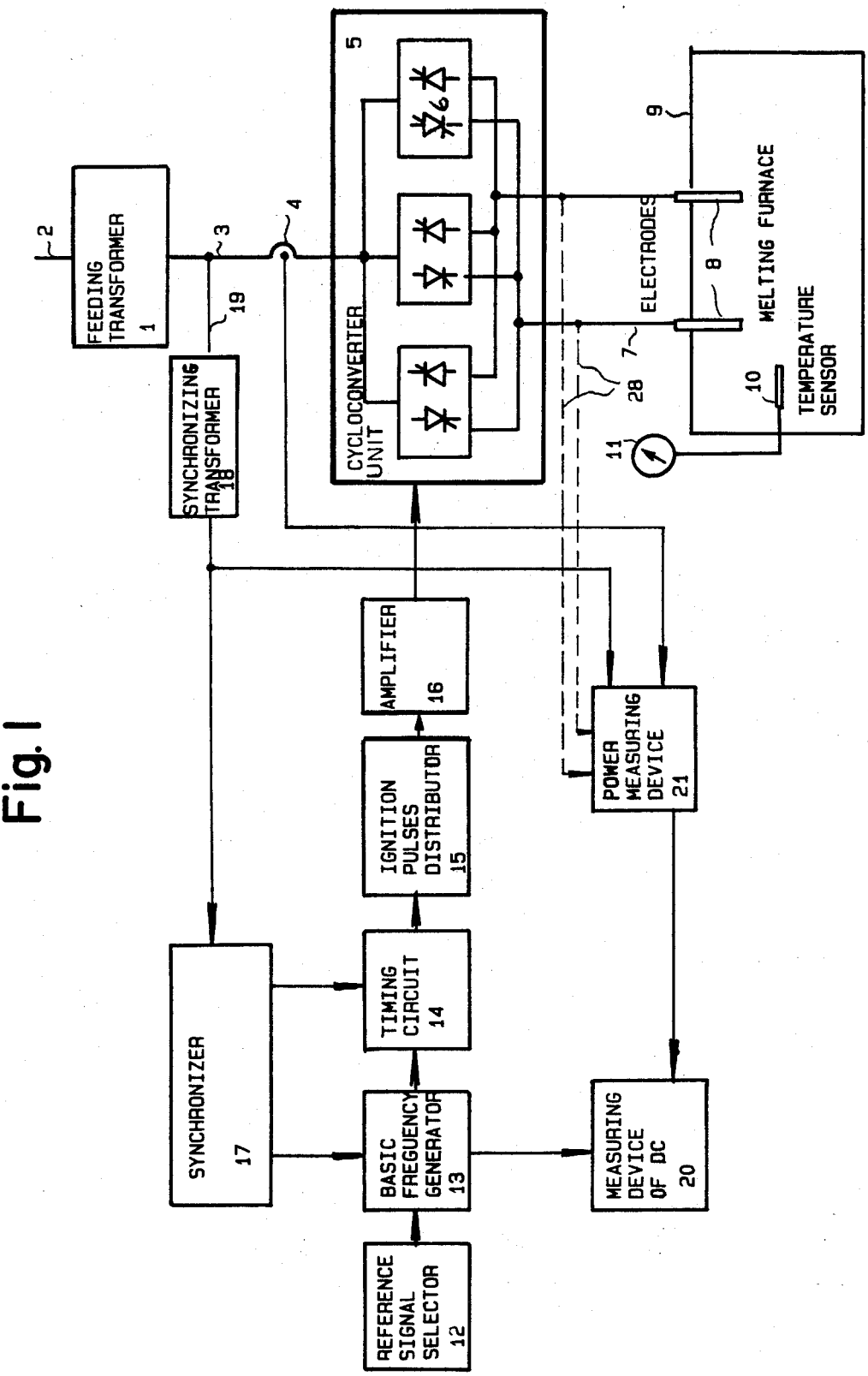
FIG. 1 is a block wiring diagram of the feeding current source with circuits for controlling the frequency, for measuring power, and the DC component.

With reference to FIG. 1, an alternating feeding source 1 is connected to a three-phase network 2 and connected by a feeding line 3 to a current sensor 4 and a cycloconverter 5 provided with thyristors 6. Single phase output 7 of the converter 5 is connected to melting electrodes 8 which are engaged in the melting furnace 9. A temperature sensor 10 is situated within melting furnace 9 and is connected to a temperature indicator 11 outside the furnace 9. A reference signal selector 12 is connected by way of a basic frequency generator 13 to a timing circuit 14 which serves also for the manual setting up of the power. Timing circuit 14 is connected to an ignition pulse distributor 15 which is connected to an amplifier 16 which in turn is connected with thyristors 6 in the cycloconverter 5. A synchronizer 17 is connected by way of a synchronizing transformer 18 and a connecting line 19 to the feeding line 3. The synchronizer 17 is also connected to the basic frequency generator 13 and to the timing circuit 14. The output of a measuring device 20 of DC is connected to the basic frequency generators 13. The input of measuring device 20 of DC is connected with the output of a power measuring device 21. The voltage input of a power measuring device 21 is connected by way of synchronizing transformer 18 and by connecting line 19 to the feeding line 3. The current input of power measuring device 21 is connected to current sensor 4.

Figure 2:
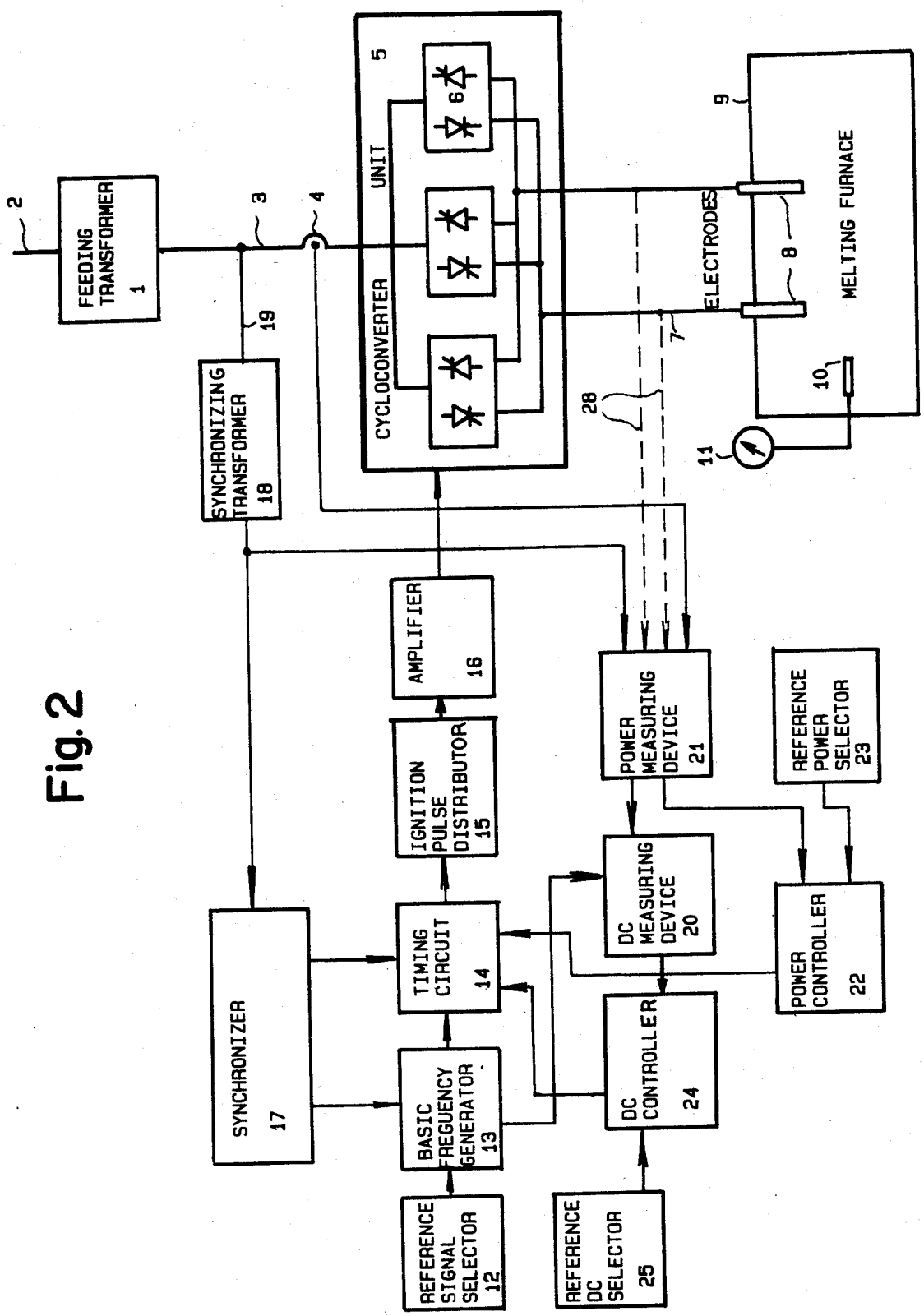
FIG. 2 is a block wiring diagram as in FIG. 1 with provisions for the controlling of power and the DC component.

Referring to FIG. 2, a power controller 22 is connected by its output to timing circuit 14 for power control. The first input of power controller 22 is connected to a reference power selector 23. A DC controller 24 is connected by its output to timing circuit 14 for DC control. The first input of DC controller 24 is connected to the output of the DC measuring device 20 and the second input of the DC controller 24 is connected to reference DC selector 25.

Figure 3:
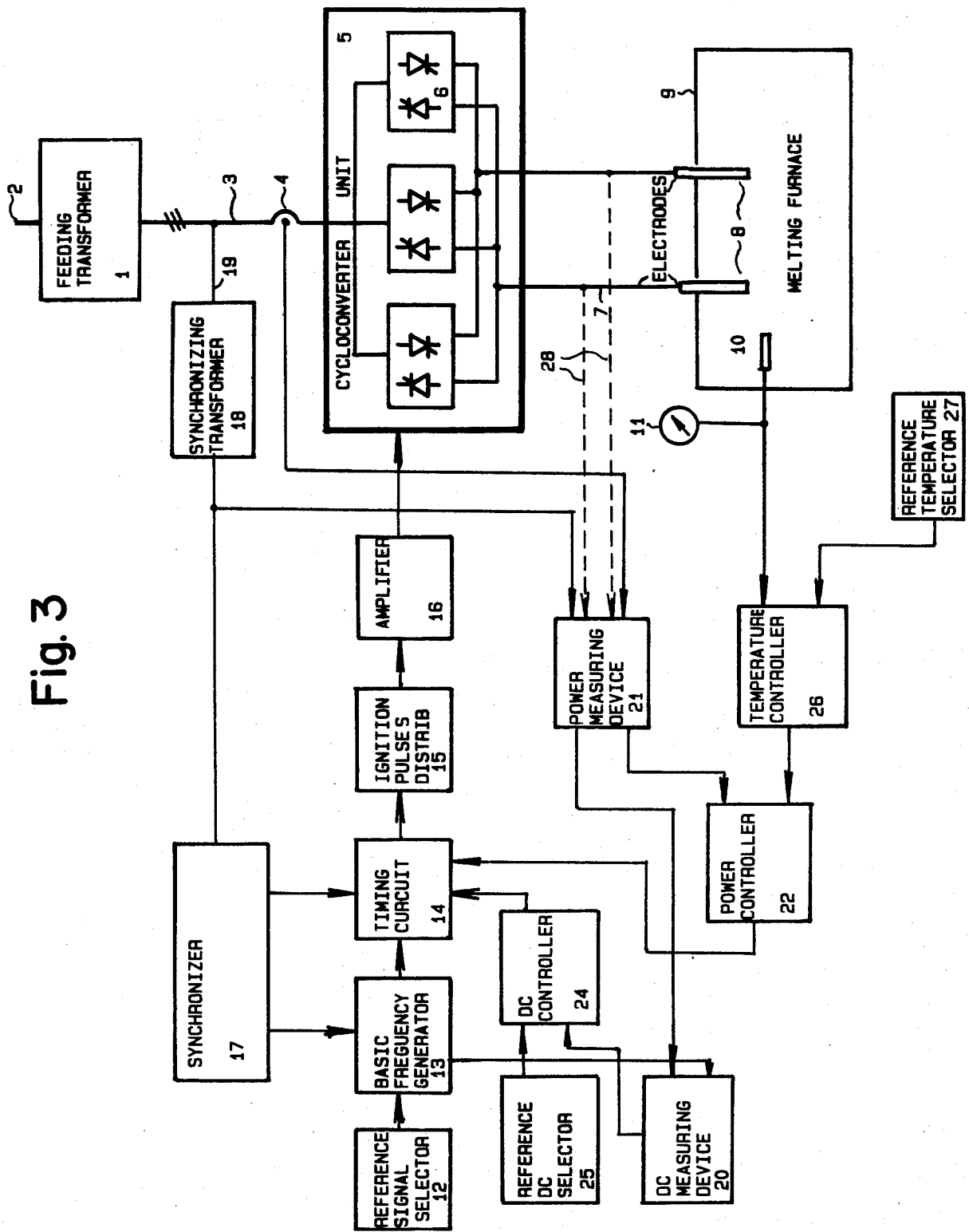
FIG. 3 is a block wiring diagram as in FIG. 1 and 2 with a circuit for glass melt temperature control.
Figure 4:
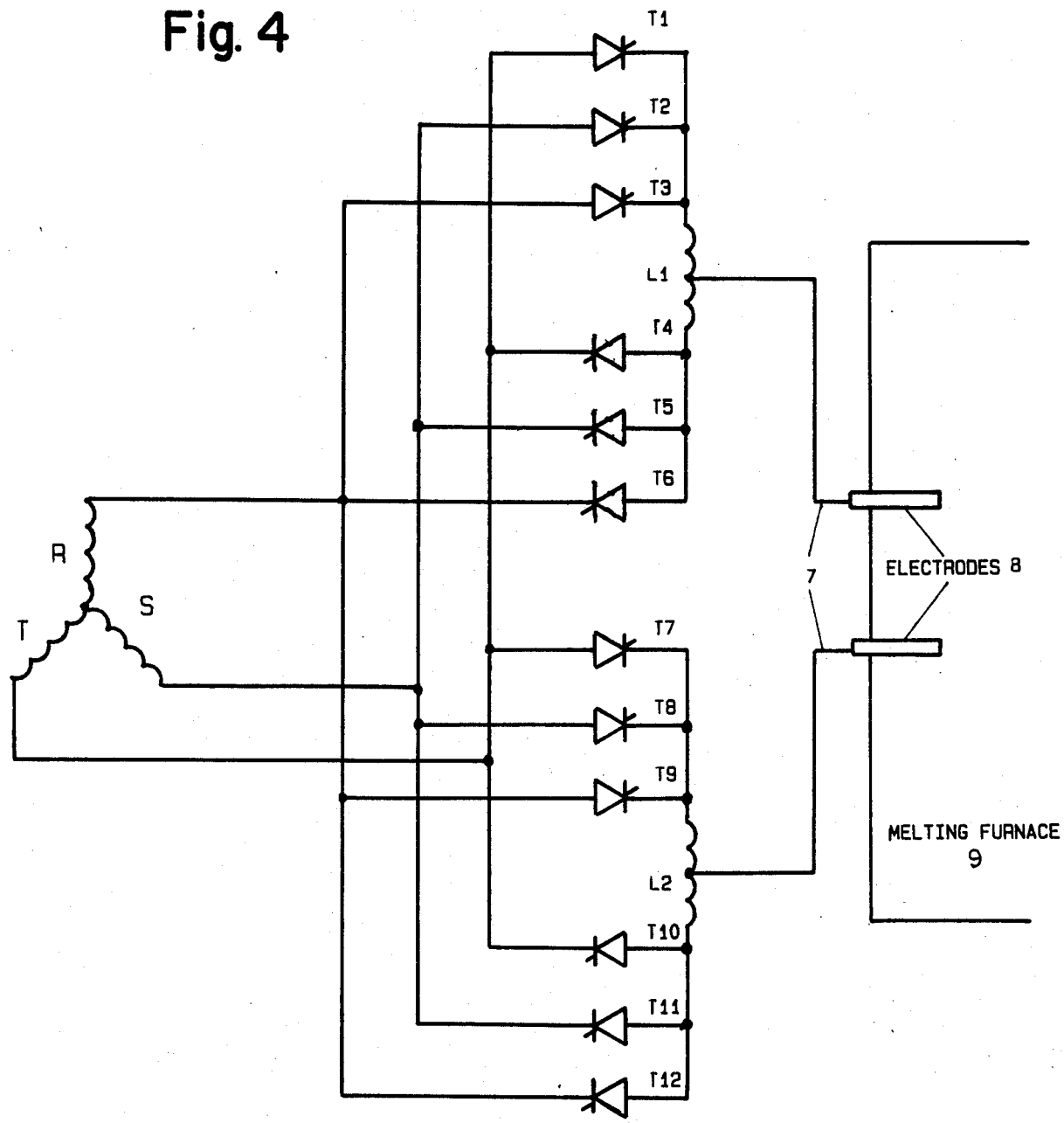
FIG. 4 illustrates a circuit of a cycloconverter feeding a glass melting furnace.
Figure 5:
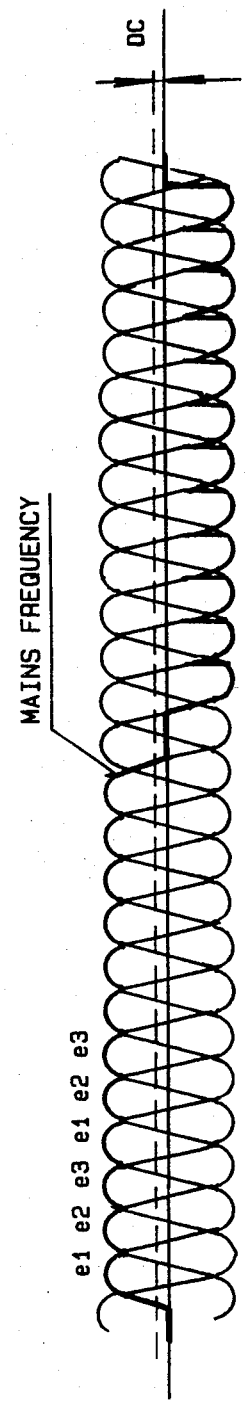
FIG. 5 illustrates the shape of the output low frequency current.

Referring to FIG. 3, the second input of power controller 22 is connected to the output of a temperature controller 26. One input of temperature controller 26 is connected to the temperature sensor 10 and the other input of temperature controller 26 is connected to a reference temperature selector 27. The temperature controller 26 therefore actuates the power controller 22 directly according to temperature changes. The reference power selector 23 (from FIG. 2) is left out.

METHOD OF OPERATION

The above described circuit arrangement operates as follows:

The required frequency (which is lower than 60 or 50 Hz) is determined according to the kind of glass to be melted and adjusted by way of reference signal selector 12. The frequency selected by the reference signal selector 12 and generated by basic frequency generator 13 is synchronized by synchronizer 17 with the network frequency. The frequency generated by basic frequency generator 13 is phase-shifted in timing circuit 14 and then distributed by ignition pulses distributor 15, amplified by amplifier 16 and led to individual thyristors 6 of cycloconverter 5. The thyristors 6 allow passage of alternating electric current of a frequency selected by reference signal selector 12 to the electrodes 8. Transmitted power is thereby measured by power measuring device 21 which receives signals from synchronizing transformer 18 and the current sensor 4. Simultaneously, the DC component is measured by measuring device of DC 20 from a signal supplied by power measuring device 21. The temperature of the melt is indicated by indicator 11 which is connected to temperature sensor 10.

According to FIG. 2 it is also possible to regulate the consumed power of the furnace 9 by comparison, in power controller 22, of the desired power value adjusted on reference power selector 23 with the true value measured by power measuring device 21.

The impulse for readjustment of power is transmitted by power controller 22 to the timing circuit 14 in which the instants of ignition pulses will be accordingly displaced.

It is also possible to measure (FIG. 1) and/or control (FIG. 2) the DC component. The signals for measuring and controlling the DC may be picked up either as a voltage signal from the output 7 of the cycloconverter 5, or as a current signal from the current sensor 4 in the feeding line 3. In both cases the signal is led into the DC measuring device 20 through the power measuring device 21. In the DC measuring device 20 the low frequency AC will be filtered by means of a filter section consisting of large capacitors and resistors, then amplified and integrated within one period of the low frequency AC. The duration of integration will be fixed by a signal taken from the basic frequency generator 13 which determines the beginning and the end of the positive and negative low frequency half-waves.

The voltage output during the integration period is proportional to the true value of the DC component (either positive or negative). This DC voltage is then introduced into the DC controller 24 and compared with the desired value taken from the reference DC selector 25. The DC controller 24 is a proportional plus an integral controller. Its output signal is introduced into the timing circuit 14 in which the instant of ignition pulses for either positive or negative half-waves will be proportionally displaced.

According to FIG. 3, it is also possible to regulate the temperature in the furnace 9 by comparison in temperature controller 26 of the desired temperature taken from the reference temperature selector 27 with the readings of the temperature sensor 10. As the temperature control is superior to the power control, the temperature controller 26 actuates the power controller 22 directly in accordance with temperature changes.

Although the invention is described and illustrated with reference to a pluratiy of embodiments thereof, it is to be expressly understood that it is in no way limited to the disclosure of such preferred embodiments but is capable of numerous modifications within the scope of the appended claims.

We claim:

1. A circuit arrangement for supplying an electric furnace for the melting of vitreous materials by the passage of alternating current with a low frequency, optimal in regard to minimal corrosion of feeding electrodes, lower than 60 or 50 Hz, comprising an alternating three-phase feeding source, a feeding line leading from said source to a current sensor and to a cycloconverter comprising thyristors enabling the change of three-phase input into a single-phase output alternating current with a simultaneous changing the input mains frequency into a said optimal output frequency, the cycloconverter being connected with said feeding electrodes, a reference signal selector of desired optimal low frequency value, the output of said selector being connected with a basic frequency generator, the output of said generator being connected with a timing circuit connected with a distributor of ignition pulses, means to amplify the ignition pulses and distribute them among thyristors in said cycloconverter, a synchronizer connected to both the basic frequency generator and the timing circuit, said synchronizer being also connected to a synchronizing transformer, the input of said synchronizing transformer being connected with the feeding line, a power measuring device provided with a voltage input connected to said synchronizing transformer, and a current input connected to said current sensor and third low frequency voltage input of said power measuring device connected to electrodes fed by low frequency current, a measuring device of the DC component the one input of which being connected with the output of said power measuring device the second input of which being connected with said basic frequency generator, a temperature sensor measuring the temperature in said furnace, and the output of said temperature sensor being connected to a temperature indicator.

2. A circuit arrangement as claimed in claim 1, further comprising a power controller, the output of which is connected to said timing circuit, a reference power selector of the desired power value, one input of said power controller being connected to the output of said power measuring device and a second input of said power controller being connected to the output of said reference power selector, a DC controller the output of which is connected to said timing circuit, a reference DC selector of the desired DC value, one input of said DC controller being connected with the output of said reference DC selector, and a second input of said DC controller being connected with said DC measuring device.

3. A circuit arrangement as claimed in claim 2, further comprising a reference temperature selector, a temperature controller, a second input of said power controller being connected to the output of said temperatue controller, said temperature controller being connected both to the reference temperature selector and said temperature sensor.

* * * * *